Figure 1:
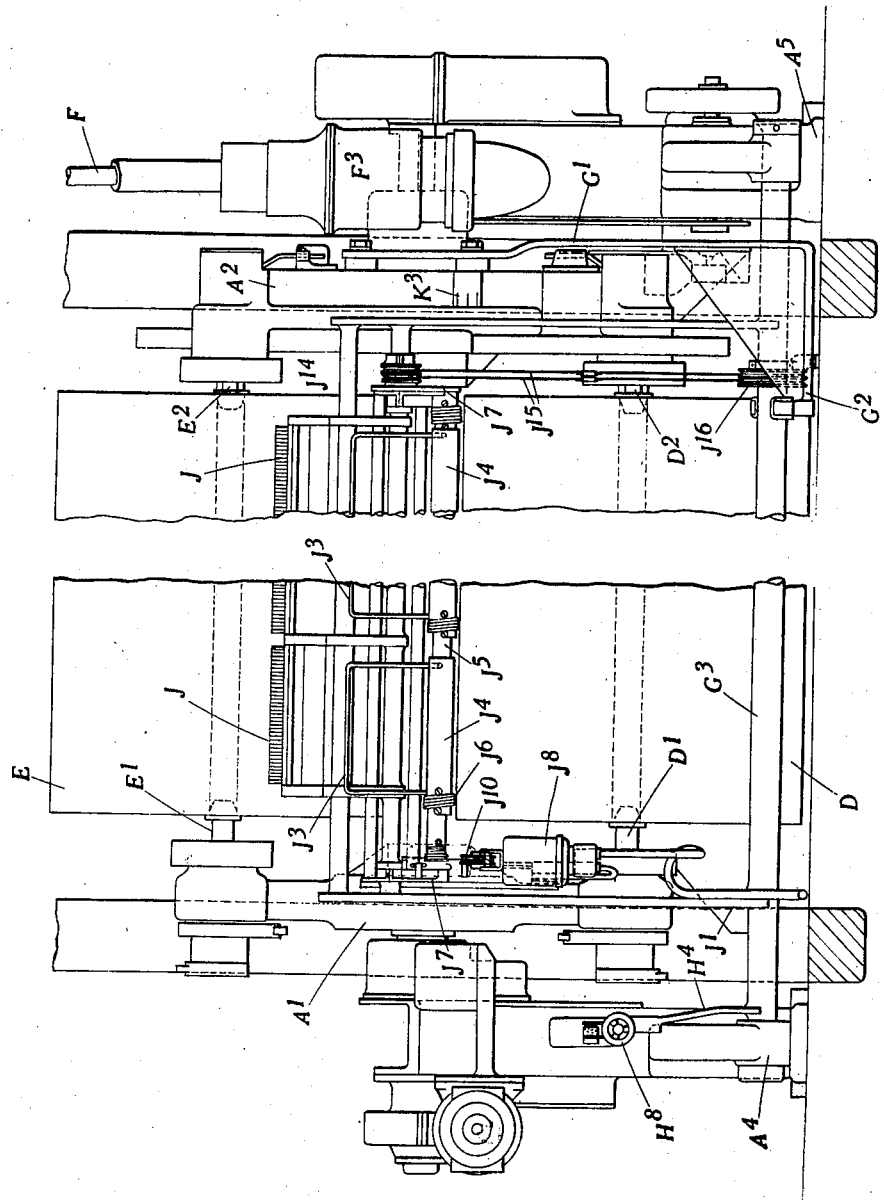

July 15, 1941.     A. T. ROBERTSON     2,249,669
WEB-JOINING MECHANISM
Filed May 1, 1939     9 Sheets-Sheet 2

Inventor
Alexander T. Robertson
by
Watson, Cole, Grindle & Watson
Attorney

July 15, 1941.   A. T. ROBERTSON   2,249,669
WEB-JOINING MECHANISM
Filed May 1, 1939   9 Sheets-Sheet 4

Inventor
Alexander T. Robertson
by
Watson, Cole, Grindle & Watson
Attorney

July 15, 1941.  A. T. ROBERTSON  2,249,669
WEB-JOINING MECHANISM
Filed May 1, 1939  9 Sheets-Sheet 6

Inventor
Alexander T. Robertson
by
Watson, Cole, Grindle & Watson
Attorney

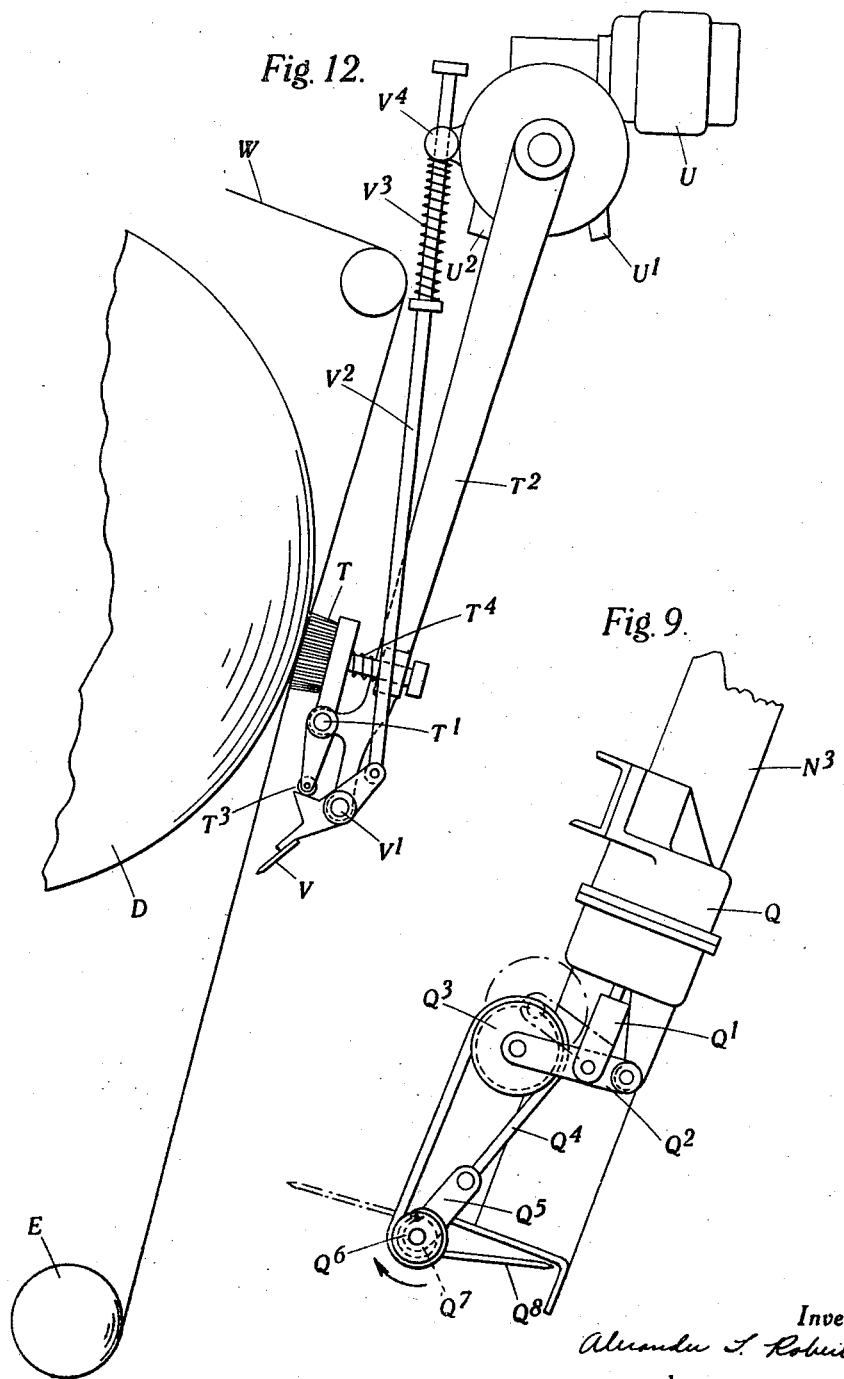

Patented July 15, 1941

2,249,669

UNITED STATES PATENT OFFICE 2,249,669

WEB-JOINING MECHANISM

Alexander Thornton Robertson, Newcastle-on-Tyne, England, assignor to J. H. Holmes & Company Limited, Hebburn-on-Tyne, England, a company of Great Britain Application May 1, 1939, Serial No. 271,223
In Great Britain May 4, 1938

16 Claims. (Cl. 242—58)

This invention relates to web-feeding and joining mechanism for printing presses and the like, and of the kind having means whereby a replacement roll of web is caused to execute a translational movement towards a running web and the said replacement roll is at the same time rotated about its own axis so that when contact is made between the replacement roll and the running web, the peripheral speed of the replacement roll is equal to, or bears a predetermined relationship to, the linear speed of the running web the expiring end portion of which is thus joined to the replacement web, by adhesive previously applied thereto, without necessitating slowing down of the press.

An object of the invention is to provide for accurate determination of the point of contact of the running web with the replacement roll so as to ensure that the running web will be satisfactorily joined to the extreme end of the replacement web.

A further object is to provide mechanism comprising means whereby the rotational movement imparted to the replacement roll about its own axis is directly related to the translational movement of the roll towards the running web, and a backing device for the running web, the said backing device being moved into a definite predetermined position in the path of the translational movement of the replacement roll so that the pasting pressure is applied to the running web between the replacement roll and the backing device at the said position determined by the backing device. The translational and rotational movements of the replacement roll and the predetermined position of the backing device are so determined in relation to each other that the periphery of the replacement roll will contact with the running web at a predetermined part of the said periphery.

Another object of the invention is to provide means whereby the predetermined position of the backing device in the path of the translational movement of the replacement roll can be adjusted at will in accordance with the diameter of the replacement roll, the timing of the rotation of the replacement roll about its own axis relatively to the translational movement of the replacement roll remaining substantially constant. Alternatively, the predetermined position of the backing device in the path of the translational movement of the replacement roll may remain constant whilst means are provided whereby the timing of the rotation of the replacement roll about its own axis relatively to the said translational movement can be determined at will in accordance with the diameter of the replacement roll.

According to yet a further object of the invention means are provided whereby the position of the adhesive on the replacement roll at the commencement of the translational movement thereof is so determined in accordance with the said translational and rotational movements and the predetermined position of the backing device that the running web always contacts with the replacement roll at a part thereof in advance of the adhesive. The translational and rotational movements may be transmitted to the replacement roll from the press through mechanical transmission means, or by driving means whose speed is related to that of the press.

Figure 2:
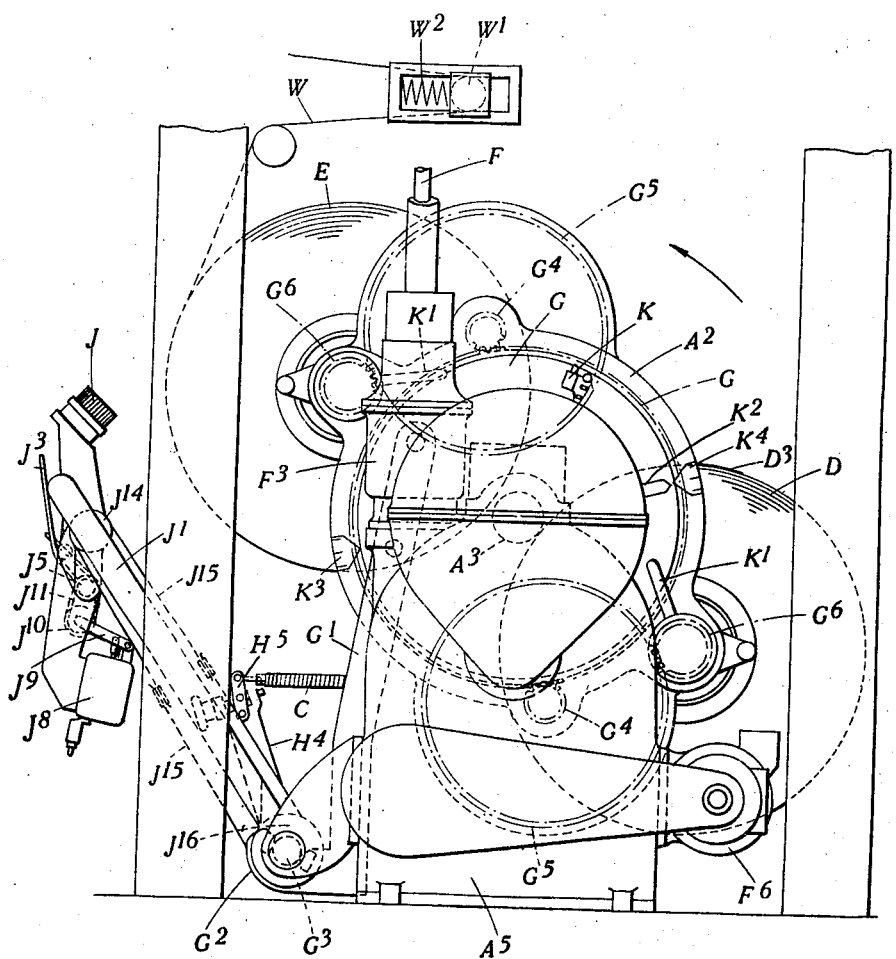
Figure 3:
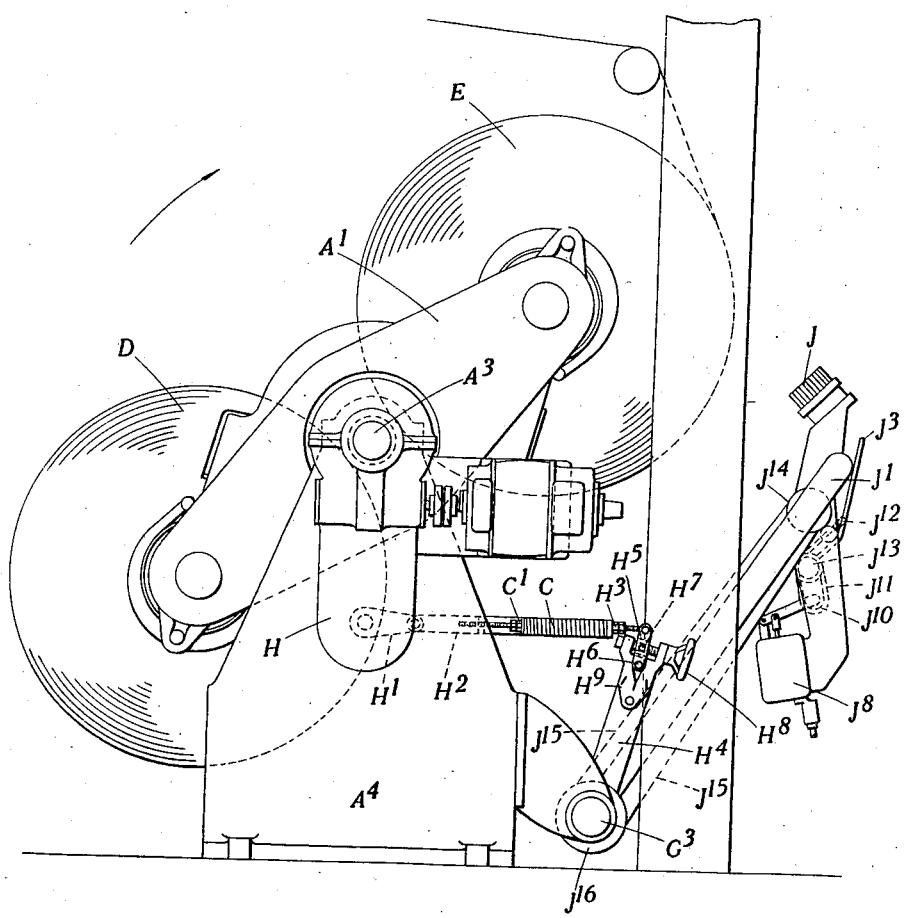
Figure 4:
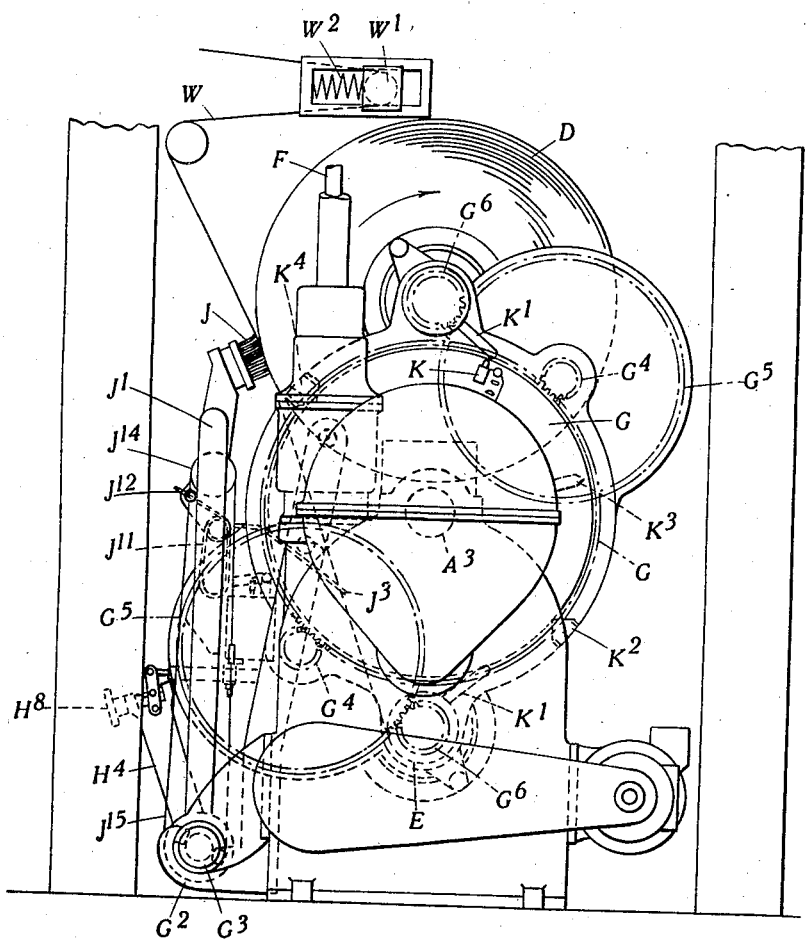
Figure 5:
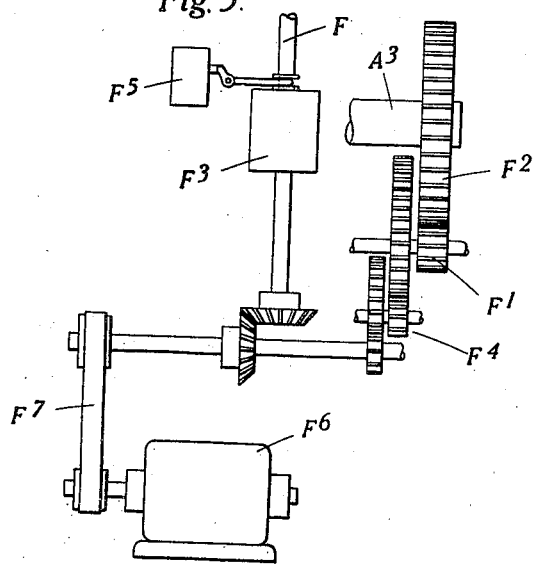
Figure 10:
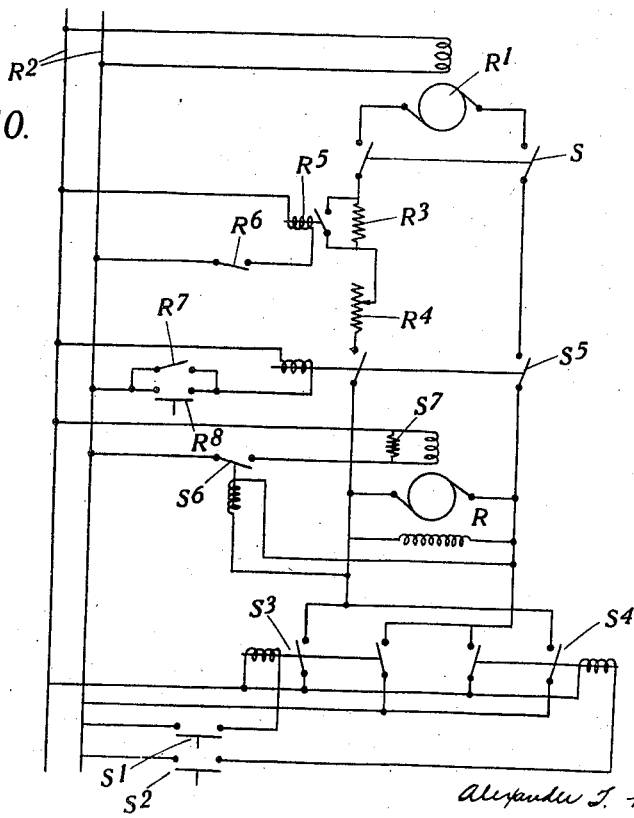
Figure 11:
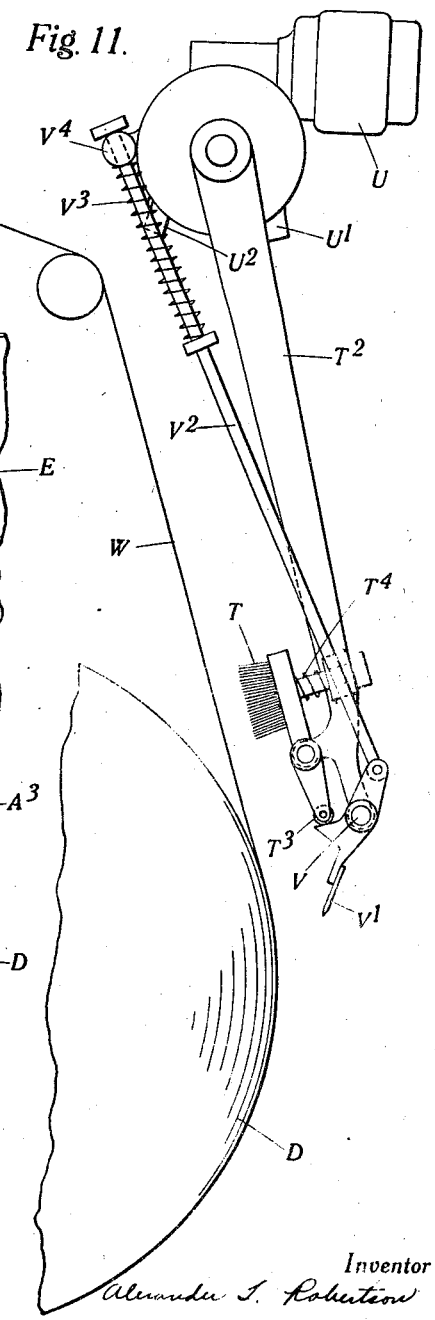
Figure 6:
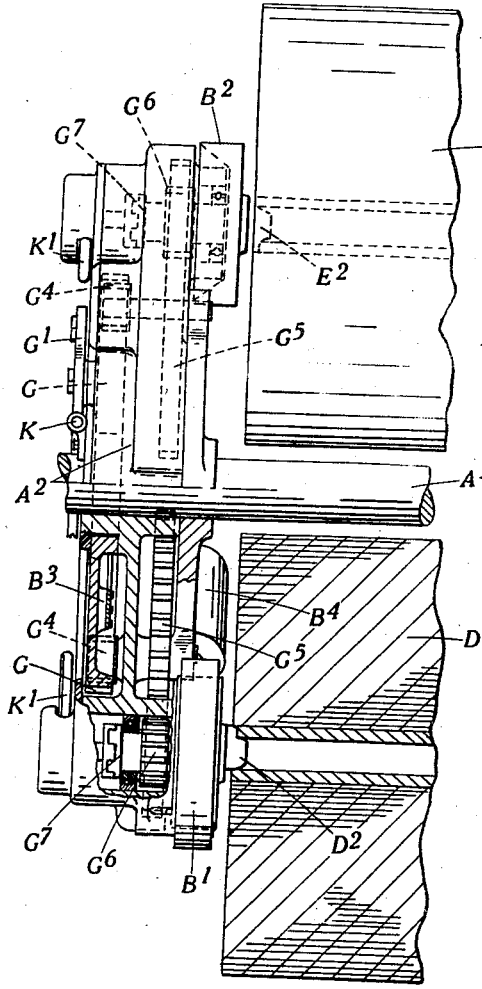
Figure 7:
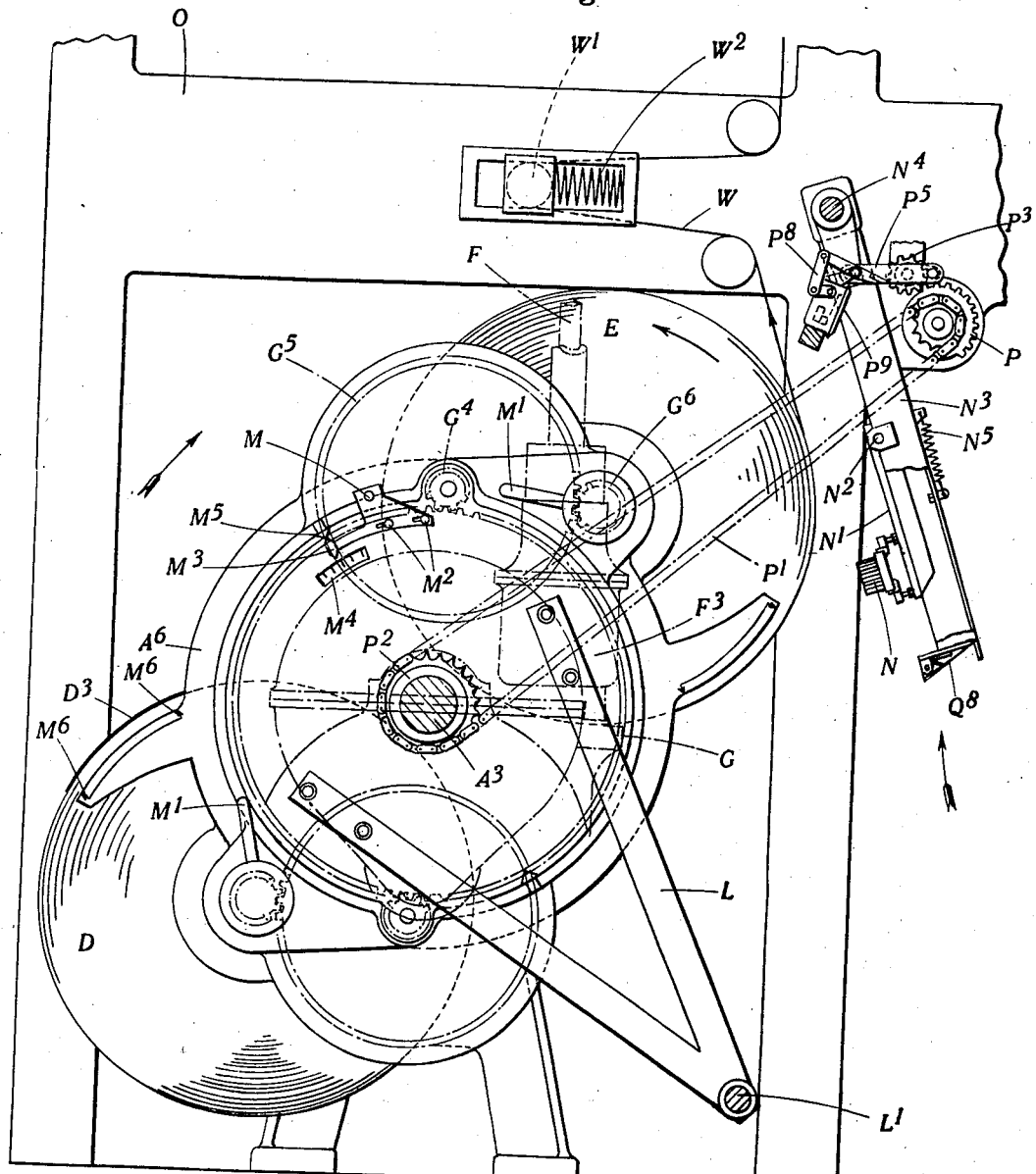
Figure 8:
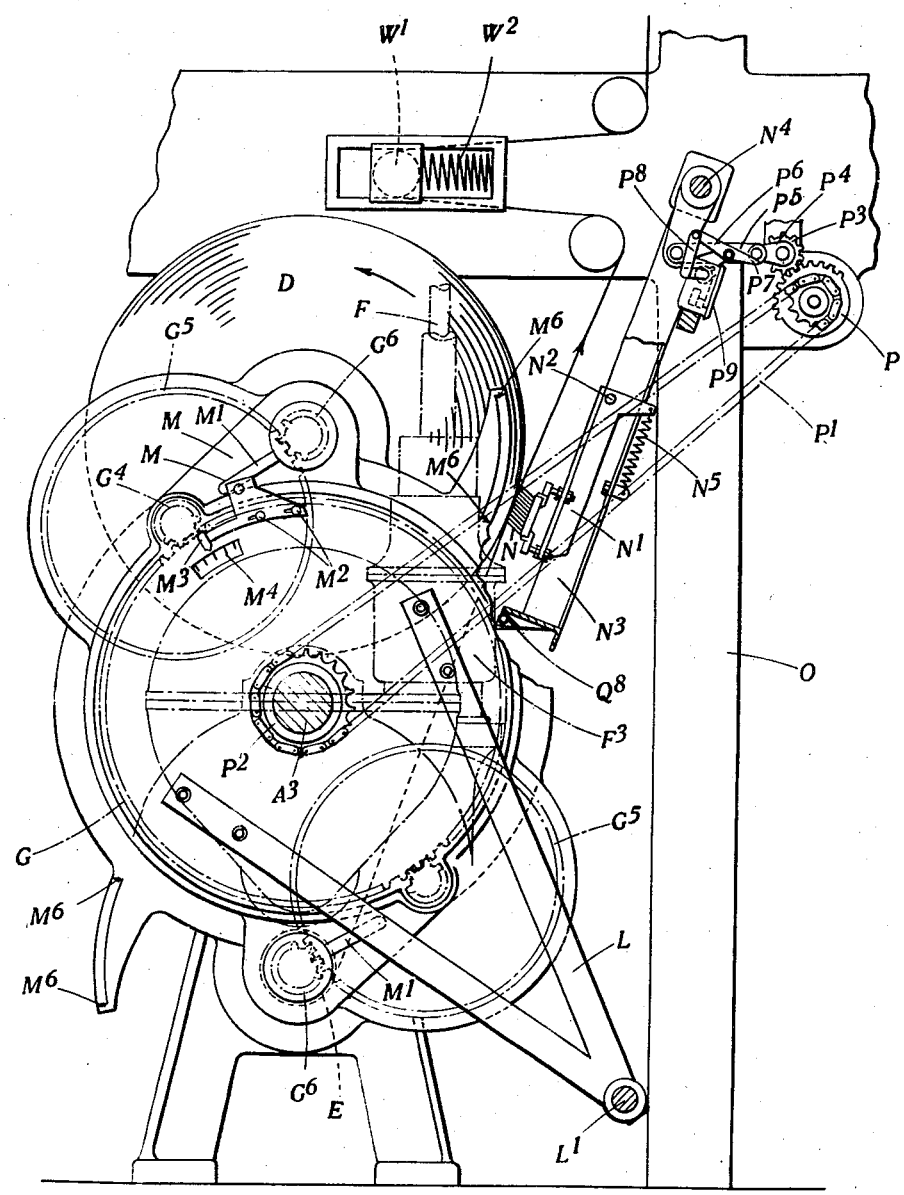

The invention may be carried into practice in various ways but two constructions, together with some modifications thereof, are shown somewhat diagrammatically and by way of example in the accompanying drawings, in which Figure 1 shows one construction of reel stand or frame with the central portions of the rolls, main shaft and backing device cut away, Figure 2 is an end view from right to left of Figure 1 but including a web-tensioning device, Figure 3 is an end view from left to right of Figure 1, Figure 4 is an end view similar to that of Figure 2 but with the parts in the positions they occupy during the pasting operation, Figure 5 illustrates diagrammatically the mechanism for transmitting the drive to the spiders about the main axis, Figure 6 shows one spider partly in section and the adjacent ends of the web rolls, Figures 7 and 8 are end elevations of another construction according to the invention, Figure 9 is an enlarged view of the web severer or knife included in each of Figures 7 and 8, Figure 10 indicates diagrammatically one arrangement for driving the reel frame by power derived from a generator driven by the press, and Figures 11 and 12 illustrate a modified form of backing device which may be employed in conjunction with the construction shown in Figures 7 and 8.

In the construction shown in Figures 1 to 4 the machine comprises a two-armed reel stand or frame in the form of two end spiders $A^1$, $A^2$ carried on a main shaft $A^3$ journalled in bearings mounted on pedestals $A^4$, $A^5$. The rolls of web D, E are carried by stub shafts or chucks $D^1$, $D^2$, $E^1$, $E^2$ journalled in the spiders $A^1$, $A^2$ which are relatively adjustable to accommodate different lengths of roll, i. e. different widths of web. The chucks $D^1$, $E^1$ on the spider $A^1$ are retractable for centering the rolls D, E which are rotated about their own axes by mechanism carried by the other spider $A^2$ as hereinafter described.

The running web W is drawn by the press from the web roll which lies in the supply position, that is to say the supply roll E in Figures 2 and 3, though it should be noted that in Figure 1 the rolls D and E are, for the sake of clarity, shown in vertical alignment, i. e. in the pasting position. The running web W is carried over a tension device constituted by a floating roller $W^1$ loaded by a spring $W^2$. The main shaft $A^3$ has secured thereto a toothed wheel $F^2$ (Figure 5) which is engaged by a gear wheel $F^1$ driven from the press through a shaft F, slipping clutch $F^3$ and a gear train $F^4$, the clutch $F^3$ being controlled by a solenoid $F^5$. An electric "rotation" motor $F^6$ is provided for rotating the frame, i. e. the spiders $A^1$, $A^2$, through a belt $F^7$ when the press is not in operation, or for adjusting the height of the chucks $D^1$, $D^2$ or $E^1$, $E^2$ of the roll D or E whichever may be about to be placed in the replacement position, that is to say the position occupied by the roll D in Figures 2 and 3.

An annular rack G concentric with the main shaft $A^3$ is arranged within the spider $A^2$ and is held against rotation by means of a strap $G^1$ furnished at its lower end with a hook-like bearing $G^2$ embracing an oscillating shaft $G^3$ journalled in bearings at the bases of the pedestals $A^4$, $A^5$. The annular rack G together with the strap $G^1$ can thus be adjusted in the direction of the length of the machine whilst the rack is held against rotation about the main axis $A^3$ by the sliding bearing $G^2$ engaging the shaft $G^3$. The rack G housed within the spider $A^2$ meshes with two intermediate pinions $G^4$ mounted to rotate about secondary axes on the spider $A^2$ and secured to or integral with pinions $G^5$ which mesh with two driven pinions $G^6$ on the two chucks $D^2$, $E^2$. Each of the two driven pinions $G^6$ has a dog clutch $G^7$, shown in Figure 6, whereby the pinion can be coupled to or uncoupled from the associated chuck $D^2$ or $E^2$.

With this arrangement, when the frame is set in rotation with one or other of the clutches $G^7$ in engagement not only will the rolls D, E move translationally about the axis of the main shaft $A^3$, but the intermediate pinions $G^4$ in travelling round the fixed annular rack G will be rotated so as to drive that roll whose clutch $G^7$ is in the engaged position. Thus, when the spiders $A^1$, $A^2$ are turned to cause translational movement of the replacement roll towards the running web W with the corresponding clutch $G^7$ engaged, this roll will be accelerated up to a peripheral speed substantially equal to the linear speed of the running web W before contact of the replacement roll with the running web, as hereinafter fully described.

With a view to ensuring that the peripheral speed of the replacement roll is equal to, or bears a predetermined relationship to, the linear speed of the running web W, the drive of the spiders— and with it the replacement roll—is made to vary directly as the speed of the running web and is adjusted to suit rolls of different diameters, if the diameters vary to a greater extent than can be successfully pasted in practice without such adjustment. The said predetermined relationship between the linear speed of the web W and the peripheral speed of the replacement roll is, in the construction shown in Figures 1 to 4, obtained by the mechanical drive transmitted from the press through the shaft F and clutch $F^3$. This mechanical drive may, however, be replaced by electrical means designed to produce the same, or approximately the same, results as the mechanical drive. An example of such electrical drive is described below with reference to Figure 10.

The device for backing the running web W is operated in timed relation with the translational movement of the web rolls D and E, by the rotational movement of the spiders about the axis of the main shaft $A^3$ so as to back the running web W in a predetermined position. To this end the main shaft $A^3$, driven through the clutch $F^3$, is coupled at one end, as shown in Figure 3, through a gear train arranged within a casing H to an actuating crank $H^1$ which is in turn connected through links $H^2$, $H^3$ to a crank arm $H^4$ secured to the oscillating shaft $G^3$. The gear train within the casing H is of the intermittent type comprising Geneva wheels, i. e. a mutilated gear or the like. The shaft $G^3$ carries two arms $J^1$ which extend upwardly adjacent to the two ends of the machine respectively and support between them at their upper ends a number of backing brushes J. The links $H^2$, $H^3$ are connected to the crank arm $H^4$ through an intermediate lever $H^5$ connected to the crank $H^4$ by a pivot pin $H^6$ and carrying a collar $H^7$ which is internally screwthreaded for engagement by a screwthreaded spindle furnished with an adjusting wheel $H^8$. The intermediate lever $H^5$ is formed at one end as a pointer which cooperates with a scale of roll diameters $H^9$ delineated on the crank arm $H^4$. Adjustment of the wheel $H^8$, in effect, varies the length of the coupling between the actuating crank $H^1$ and the crank arm $H^4$. Thus, when the spiders are rotated about the axis of the main shaft $A^3$ thereby causing translational movement of the rolls D and E, the shaft $G^3$ is simultaneously oscillated, in timed relation to the rotation of the spiders as determined by the mutilated gear in the casing H, so as to move the backing brushes J towards and away from the running web W. The travel of the brushes J towards the web W, and therefore the definite predetermined position at which the running web W is backed during the paste, is thus predetermined in accordance with the setting of the adjusting wheel $H^8$.

The brushes J are carried at the upper ends of the arms $J^1$ which also carry a web severing device constituted by loops $J^3$ of stout wire. Each loop $J^3$ is carried by a sleeve $J^4$ which can turn on a shaft $J^5$ against the action of a spring $J^6$. The shaft $J^5$ is supported between end plates $J^7$ one of which supports a solenoid $J^8$ whose armature is connected through a lever $J^9$ to a pulley $J^{10}$. A wire $J^{11}$ anchored at one end $J^{12}$ to a fixed part passes round the pulley $J^{10}$ and has its other end anchored to a pulley $J^{13}$ secured to the shaft $J^5$. The second end plate $J^7$ has secured thereto a pulley $J^{14}$ connected as shown by two wires $J^{15}$ to a pulley $J^{16}$ concentric with the shaft $G^3$ but not secured thereto, the pulley $J^{16}$ being secured to the floor or a fixed part of the base of the machine.

The fixed annular toothed rim G is provided with a cam or projection K for controlling the clutches $G^7$ by cooperating with clutch control levers $K^1$. Delineated on the fixed annular rack G at a fixed circumferential spacing from the clutch control cam K is a pointer or index mark K² for cooperation with either of two indicators K³, K⁴ on the spider A², the indicator K⁴ being spaced circumferentially in front of the axis of the roll D whilst the indicator K³ is circumferentially spaced in front of the axis of the roll E. Each of the indicators K³, K⁴ is divided in the circumferential direction by graduations indicating different roll diameters.

Assuming that the press is in operation and the running web W is being drawn from the roll E in the supply position as shown in Figure 2 and thence over the floating roller W¹ to the press, the chucks D¹, D² for receiving the replacement roll D will lie in the position shown in Figure 2. After retracting the chuck D¹ the replacement roll D is centered between the chucks D¹, D² by placing one end of the roll D in engagement with the driving chuck D² and then bringing the other end of the roll D into alignment with the retractable chuck D¹, the spiders A¹, A² being, if necessary, turned about the axis of the main shaft A³ for this purpose by operation of the rotation motor F⁶ while the roll D is still supported on the truck. The retractable chuck D¹ is now rendered operative and the truck is removed.

After the replacement roll D has thus been mounted in position the end portion of the web carried thereby is prepared by the application of adhesive D³ thereto, the end having been lightly secured to the periphery by any suitable means, for example grease, and a tab attached to the periphery at this end. Both the chuck clutches G⁷ being disengaged, the spiders A¹, A² carrying the rollers D and E are rotated about the axis of the main shaft A³ by operation of the "rotation" motor F⁶ so that the two rolls D and E move translationally in the direction of the arrow shown in Figures 2 and 3, but rotational movement about their own axes is not transmitted to the rolls from the fixed annular rim G. This translational movement is continued until the replacement roll D reaches the "starting" position shown in Figures 2 and 3, namely when the indicator K⁴ comes into alignment with the fixed pointer or index mark K². The diameter of the replacement roll D can now be accurately measured on the indicator K⁴ by laying a straight edge along the top of the roll D and reading the diameter off the scale on the indicator K⁴. The adjustment wheel H⁸ on the crank arm H⁴ is now adjusted until the pointer on the intermediate lever H⁵ is brought to the corresponding reading on the cooperating scale H⁹, that is to say, for example, if the diameter of the replacement roll D measured as above described is thirty-eight inches the pointer of the adjusting device H⁸ is set to the corresponding graduation on the cooperating scale H⁹. The replacement roll D (with its clutch G⁷ still disengaged) is next turned about its own axis until the paste D³ on the periphery of the roll registers with the associated indicator K⁴, the chuck clutch G⁷ for the replacement roll D being then rendered operative.

The machine, which during these setting operations has remained operative at the normal speed, is now ready for automatic pasting, the parts being in the positions shown in Figures 2 and 3, suitable electrical interlocks being provided to prevent disturbance of the parts from the said positions and also to prevent mal-operation. When the supply roll E is about to expire the slipping clutch F³ is rendered operative by energising the solenoid F⁵ so that the drive will be transmitted from the press through the shaft F to the main shaft A³ and spiders A¹, A² thus causing not only translational movement of the web rolls D and E about the main axis but, since the clutch G⁷ associated with the replacement roll D is now engaged, the roll D will be rotated about its own axis in the clockwise direction as viewed in Figure 4. At the same time movement will be transmitted from the actuating crank H¹ through the links H², H³ to the oscillating shaft G³ so that the backing brushes J move forward towards the running web W. As the arms J¹ move forwards the wires J¹⁵ cause rotation of the end plates from the position shown in Figure 3 towards the position shown in Figure 4. Since the effective length of the links H², H³ has been set in accordance with the diameter of the replacement roll D, the backing brushes J will be brought into a definite position which is predetermined in accordance with the said diameter, that is to say the forward position shown in Figure 4. As the translational movement of the replacement roll D proceeds its rotational movement about its own axis is accelerated up to a peripheral speed equal to or approaching the linear speed of the running web W with which the periphery of the replacement roll D then comes into contact at a part in advance of the pasted portion or tab D³. When the pasted portion D³ comes into contact with the running web W, at the said predetermined position determined by the brushes J, it adheres to the running web W and the end of the web is drawn off the periphery of the replacement roll D and firmly adheres to the running web W. The replacement roll D and the expiring roll E are now in the positions shown in Figure 4. The dwell of the backing brushes J in the predetermined set position shown in Figure 4 is sufficiently long to enable adequate pressure for pasting to be applied before the oscillating shaft G³ commences to turn in the reverse direction so as to move the backing brushes J away from the running web W towards the original position shown in Figures 2 and 3. Preferably, the backing brushes during the first part of their return movement recede from the inward limit position more slowly than the translational movement of the replacement roll, the spring C preventing undue load on the mechanism due to excessive pressure on the brushes.

At or about the point in the translational movement of the replacement roll D at which this makes contact with the running web W, the fixed clutch control cam K engages the clutch-operating lever K¹ associated with the replacement roll D and disengages the corresponding clutch G⁷. Immediately after the paste has been made the solenoid J⁸ is energised, for example automatically or by operation of a push button. The pulley J¹⁰ is drawn down by the lever J⁹ so that the shaft J⁵ is rotated in the counterclockwise direction as viewed in Figures 2 and 4. The web connected to the expiring roll E is thus severed, and the solenoid J⁸ again deenergised, the roll-braking being at the same time transferred from the chuck brake B¹ of the original supply roll E to the chuck brake B² of the roll D now constituting the supply roll. To this end the fixed annular toothed rim G⁴ is provided internally with slip rings B³ to which braking current is supplied and which cooperate with contacts (not shown) carried by the spider A² for selectively controlling the energisation of two brake solenoids (one of which is shown at B⁴ in Figure 6) respectively controlling the chuck brakes B¹, B². Thus when the roll E is in the supply position the corresponding solenoid $B^4$ is energised so as to apply the brake force to the supply roll and when the spiders $A^1$, $A^2$ have been turned to bring the roll D into the supply position the solenoid $B^4$ is automatically deenergised and the corresponding solenoid for the chuck brake $B^2$ is energised. As the backing brushes J move away from the new supply roll D the wires $J^{15}$ turn the end plates $J^7$ so as to swing the solenoid $J^8$ and the associated parts clear of the path of the translational movement of the rolls. The spiders $A^1$, $A^2$ continue to rotate about the axis of the main shaft $A^3$ until the new roll D has reached the supply position when the drive from the press is discontinued by automatic disconnection of the clutch $F^3$.

The cutter wires or loops $J^3$ are positioned to suit various lengths of roll, i. e. full length, three-quarter length, half length and quarter length, so that the web will be successfully severed whatever its width. When dealing with rolls of less than full width and the positioning of the spiders is such that one of the loops $J^3$ will, during the severing operation, strike against the adjacent spider, the corresponding spring $J^6$ will yield, the web being severed by the loops $J^3$ lying between the spiders.

The ratio of the transmission of the drive from the press to the main shaft $A^3$ is such that when the clutch $F^3$ has stopped slipping, that is to say when the main shaft $A^3$ is in effect connected directly to the press, the peripheral speed of a thirty-eight inch diameter roll will be substantially equal to the linear speed of the running web W. Any difference between the peripheral speed of the replacement roll D and the linear speed of the running web W due to the diameter of the replacement roll D differing from thirty-eight inches, will be automatically compensated for by the floating roller $W^1$. As will be seen from Figure 3 the links $H^2$ and $H^3$ are coupled through a compression spring C whose initial tension can be set by means of lock nuts $C^1$. This spring coupling between the links allows the drive to yield resiliently during contact of the replacement roll D and backing brushes J with the running web W.

It will be seen that the contact of the periphery of the replacement roll D with the running web W in the predetermined position backed by the brushes J will take place at a given predetermined rotational position of the spiders $A^1$, $A^2$ irrespective of the diameter of the replacement roll D. Thus, when setting the apparatus in readiness for making a paste the spiders $A^1$, $A^2$ will always be initially set at one and the same fixed "starting" position as determined by the fixed pointer or index mark $K^2$ in cooperation with one or other of the indicators $K^3$, $K^4$, and after rotational movement of the replacement roll D about its own axis has taken place to accelerate this roll up to speed, the chuck clutch $G^7$ of the replacement roll will always be disengaged at the same point in the translational movement of the roll about the axis of the main shaft $A^3$ by the fixed control cam K. The timing of the commencement of rotation of the replacement roll about its own axis relatively to the angular movement of the spiders, and the timing of the disconnection of the corresponding clutch $G^7$ thus remain constant for all roll diameters, the predetermined position of the backing brushes J in the path of the translational movement of the replacement roll being adjusted in accordance with the diameter of the said roll by means of the adjusting wheel $H^3$. In this way the only preparatory adjustment required, apart from initial positioning of the spiders $A^1$, $A^2$ and replacement roll, is the manual setting of the adjusting wheel $H^8$ in accordance with the diameter of the replacement roll.

The path followed by the part of the replacement roll bearing the adhesive $D^3$ during the acceleration of the roll is constituted by a series of whorls the pitch or spacing of which will be determined by the ratio of the drive between the fixed annular rim G and the driven pinion $G^6$ on the replacement roll. The size of each whorl, however, depends upon the diameter of the replacement roll but, since the commencement of the acceleration period remains constant as determined by the indicator $K^2$ and the position of the backing for the running web W by means of the brushes J is determined in accordance with the diameter of the replacement roll, the point on the periphery of the replacement roll which contacts with the running web W will always be substantially the same whatever the diameter of the replacement roll, and will always be in advance of the adhesive $D^3$.

Instead of the definite predetermined position of the backing device being adjustable in accordance with the diameter of the replacement roll whilst the timing of the commencement of the rotation of the replacement roll about its own axis relatively to the angular position of the spiders remains constant, the definite predetermined position of the backing device may remain constant whilst the timing of the commencement of the rotation of the replacement roll about its own axis relatively to the angular position of the spiders is adjustable in accordance with the diameter of the replacement roll.

One such arrangement is shown by way of example in Figures 7 and 8, in which the drive of the rolls D and E is generally similar to that above described, the annular toothed rim G being held against rotation by a strap L which can slide along a fixed shaft $L^1$. Thus, when the spiders are driven from the press through the clutch shaft F (omitted from Figures 7 and 8 for the sake of clarity) causing translational movements of the spider about the shaft $A^3$ the roll D or E whose clutch $G^7$ is engaged will be rotated about its own axis through the pinions $G^4$, $G^5$, $G^6$. Thus, when the spiders, one of which is shown at $A^6$, are turned to cause translational movement of the rolls about the axis of the main shaft $A^3$ as shown by the arrows in Figures 7 and 8, the clutch $G^7$ corresponding to the replacement roll is first engaged so that this roll is accelerated up to a peripheral speed substantially equal to the linear speed of the running web before contact of the replacement roll with the running web W. When the said contact is made, or shortly before or after such contact, the clutch $G^7$ is disengaged automatically by a clutch control cam M carried by the annular rack G engaging a clutch control lever $M^1$ similar to the clutch control lever $K^1$ shown in Figure 6. The position of disengagement of the clutch $G^7$ can be determined at will to suit different diameters of replacement roll by slacking of holding bolts for the cam M and adjusting the cam circumferentially as permitted by slots $M^2$. Any slight difference between the peripheral speed of the replacement roll and the linear speed of the running web W will be taken up when the paste is made by the floating roller $W^1$ and cooperating spring $W^2$.

The backing device is constituted by brushes N mounted on fingers $N^1$ pivoted at $N^2$ on arms $N^3$ pivoted at $N^4$ on the fixed frame O of the press, the fingers $N^1$ being loaded by springs $N^5$. The backing arms $N^3$ are operated by a mutilated gear P driven through a chain $P^1$ from a toothed wheel $P^2$ secured to the main shaft $A^3$. The mutilated gear P engages a sprocket $P^3$ mounted to rotate on a fixed part and secured to a short crank $P^4$ pivotally connected at one end to a link $P^5$ whose other end is connected to a crank secured to the arm $N^3$. The link $P^5$ carries a pawl $P^6$ having a nose $P^7$ at one end and connected at its other end through toggle links $P^8$ to a switch $P^9$. The switch $P^9$ controls the energisation of a solenoid Q (Figure 9) mounted on the arm $N^3$ and whose armature $Q^1$ is pivotally connected to a crank $Q^2$ carrying a pulley $Q^3$. A belt $Q^4$ anchored at one end to a lug $Q^5$ secured to the arm $N^3$ extends round the pulley $Q^3$ and is secured at its other end to a shaft $Q^6$ loaded by a coiled spring $Q^7$ which tends to turn the shaft $Q^6$ in the counterclockwise direction as viewed in Figure 9. The shaft $Q^6$ carries one or more knife blades $Q^8$ which are normally maintained in the inoperative position shown by the action of the spring $Q^7$.

Assuming that the roll E is in the supply position as shown in Figure 7 and the replacement roll D has been placed in position as above described, the end portion of the web carried by the roll D is prepared by the application of adhesive $D^3$ thereto, this end having been lightly secured to the periphery of the roll by any suitable means, for example grease.

The replacement roll must now be prepared for bringing it accurately into contact with the running web W when the roll E is about to expire. To this end the clutch control cam M is adjusted on the fixed annular rack G as permitted by slots $M^2$, in accordance with the diameter of the replacement roll D. This adjustment of the clutch control cam M is effected by moving it concentrically with the axis of the main shaft $A^3$ until a pointer $M^3$ on the cam M is brought into registration with the appropriate indication on a scale $M^4$ of roll diameters carried by the fixed rim G. By rotating the spiders, for example by means of a rotation motor such as the motor $F^6$ above described, a mark $M^5$ on the spider $A^6$ is brought into registration with the pointer $M^3$, whereupon the replacement roll D is rotated about its own axis (whilst its clutch $G^7$ is still disengaged) until the part of the replacement roll to which the adhesive $D^3$ has been applied lies between limiting marks $M^6$ provided on an arcuate extension formed on a spider $A^6$. These adjustments determine the timing of the commencement of rotation of the replacement roll D about its own axis relatively to the angular position of the spider $A^6$ and also the position of the roll D at which the clutch control member $M^1$ associated therewith is to be released, thus ensuring that the replacement roll D will come into contact with the running web W at a predetermined part of the roll in advance of the adhesive $D^3$. The clutch $G^7$ associated with the replacement roll D can now be engaged so that the mechanism is ready for movement of the replacement roll towards the running web W as soon as this is approaching expiration.

The backing brushes N and the knife $Q^8$ are now in the inoperative positions shown in Figure 7 and when the running web roll E has almost expired, the initiation of the rotation of the spiders to make a "paste" is effected by engaging the slipping clutch $F^3$. The spiders now turn about the axis of the main shaft $A^3$ to cause translational movement of the replacement roll D towards the running web W and at the same time to accelerate the replacement roll D about its own axis. After a predetermined angular rotation of the spiders about the axis of the main shaft $A^3$ the teeth of the mutilated gear P come into engagement with the gear $P^3$ which is thus turned in the counterclockwise direction so that the crank $P^4$ is driven to the left and the arm $N^3$ thus turned in the clockwise direction about the pivot $N^4$ so as to bring the backing brushes N into a predetermined position backing the running web W as shown in Figure 8. The brushes N thus definitely limit the position into which the running web W is moved towards the replacement roll D before the moment of contact of the two webs. The degree of deflection of the running web W by the backing brushes N will vary according to the diameter of the expiring roll E. Thus, when this diameter is large the deflection will be greater than when the diameter is small. Moreover, in some cases the diameter of the expiring roll E, when the paste is made, may be so small that the backing brushes N will move into the said predetermined position without causing deflection of the running web W.

As the translational movement of the replacement roll D towards the running web W continues the periphery of the roll D meets the running web at a part of the replacement roll D which is in advance of the adhesive $D^3$ so that the running web W first rubs over a part of the periphery of the roll D before reaching the adhesive $D^3$ thereon so that a satisfactory paste up to the extreme end of the replacement web is ensured. The path followed by the part of the replacement roll bearing the adhesive $D^3$ during the acceleration of the roll is constituted by a series of whorls the pitch or spacing of which will be determined by the gear ratio between the fixed annular rack G and the driving pinion $G^6$ associated with the roll D. It is however necessary to start the acceleration period earlier, i. e. at a greater distance from the running web W, with a larger diameter replacement roll than with a roll of smaller diameter, if the point of contact is always to be the same whatever the roll diameter. This is effected by the setting of the cam M and the initial setting of the replacement roll D relatively thereto as above described. When the replacement roll D comes into contact with the running web W the clutch control cam M engages the clutch control member $M^1$ as shown in Figure 8 thereby disengaging the clutch $G^7$ associated with the roll D.

After the paste the end of the web on the replacement roll D, now secured by the adhesive to the running web W, is pulled away from the periphery of the replacement roll D and passes to the press. The crank arm $P^4$ engages the nose $P^7$ of the pawl $P^6$ and thus acts through the toggle mechanism $P^8$ so as to close the switch $P^9$ and energise the solenoid Q. The armature $Q^1$ is thus operated so as to raise the pulley $Q^3$ into the position shown in chain line in Figure 9, this movement of the pulley $Q^3$ causing the shaft $Q^6$ to be rotated in the clockwise direction against the action of the spring $Q^7$ so that the knives $Q^8$ are turned into the operative position shown in chain line in Figure 9. The knives $Q^8$ thus sever the running web from the part thereof attached to the expiring reel E. The continued translational movement of the spiders about the axis of the main shaft $A^3$ and the resulting continued rotation of the mutilated gear P first releases the pawl $P^6$ so as to open the switch $P^9$ thus restoring the knives $Q^8$ to the inoperative position, and then swings the arms $N^3$ back into the operative position shown in Figure 7. The backing brushes N and the knives $Q^8$ are thus swung back out of the path of translational movement of the replacement roll as this comes into the supply position occupied by the roll E in Figure 7. The movement of the backing brushes N into the definite predetermined position for backing the running web W and the return movement of the backing brushes after the paste are such that the movements of the backing brushes take place in a substantially uninterrupted sequence, though there may be a slight dwell when the backing brushes N reach the end of the forward movement, that is to say when they reach the definite predetermined backing position.

The rate of movement of the backing brushes N into the said predetermined position is preferably such that the periphery of the replacement roll D makes contact with the running web W just when the backing brushes N have reached the fully forward or predetermined position. The dwell in this position is of sufficient duration to enable adequate pressure for pasting to be obtained before the backing brushes N move in the reverse direction.

After the running web W has been severed the brake current is transferred from the expired roll E to the new supply roll D as above described, the braking torque being preferably automatically controlled by the web tension control device so as to maintain the tension of the running web W substantially constant.

It will be seen that since the backing device at each operation backs the running web in the same definitely predetermined position, the position on the replacement roll at which contact is made is wholly dependent on the setting and movements of the replacement roll.

Though in each of the constructions above described the reel stand or frame, that is to say the supporting spiders, is driven about the axis of the main shaft through a mechanical drive from the press, whilst positioning of the spiders is effected by a "rotation" motor, the reel stand or frame may be turned about the main axis by a motor supplied with power from a press-driven generator. For example, as shown diagrammatically in Figure 10, the reel stand may be driven by a motor R, arranged in a manner similar to that of the motor $F^6$ described with reference to Figures 1 to 4, supplied with power from a generator $R^1$ driven by the press and whose field is energised from mains $R^2$, the output voltage of the generator $R^1$ being thus proportional to the speed of the press. Arranged in the circuit between the generator $R^1$ and motor R is a starting resistance $R^3$ and a roll diameter compensating resistance $R^4$ which may be adjusted manually to suit the diameter of the replacement roll. The starting resistance $R^3$ is short-circuited by a contactor $R^5$ after initial rotation of the spiders, the contactor $R^5$ being energised by the closing of a switch $R^6$ which may be operated by the rotation of the spiders or by a time-lag device. A retaining switch $R^7$ is arranged in parallel with a "paster" push-button switch $R^8$, and the field of the motor R is reversible under the control of two push buttons $S^1$, $S^2$ and two contactors $S^3$, $S^4$ energised from the mains $R^2$.

Assuming that a main control switch S has been closed, and the replacement roll has been initially positioned as above described, operation of the push button $R^8$ will close a switch $S^5$ thereby energising the armature circuit of the motor R and also actuating a contactor $S^6$ so as to close the field circuit of the motor R, which circuit is furnished with a discharge resistance $S^7$ in parallel. The motor R now commences to turn the spiders about the axis of the main shaft, this movement of the spiders automatically closing the retaining switch $R^7$. After initial rotation of the spiders the contact $R^6$ is automatically closed so that the starting resistance $R^3$ is short-circuited by operation of the contactor $R^5$. After the paste the continued rotation of the spiders about the axis of the main shaft automatically opens the retaining switch $R^7$ thus opening the switch $S^5$ and stopping the motor R. The motor R may also be employed for initial positioning of the replacement roll, that is to say for angular adjustment of the spiders about the axis of the main shaft in order to bring the bungs for the replacement roll into alignment therewith, and also for initial positioning of the replacement roll in readiness for pasting. To this end the motor R can be operated in one direction or the other directly from the mains $R^2$ by the selective control afforded by the push buttons $S^1$, $S^2$ and contactors $S^3$, $S^4$, the switches $R^8$ and $S^5$ being then open.

Instead of employing the rotary movement of the spiders to operate the backing device, this device may be operated by a separate motor. For example, as shown in Figures 11 and 12 each backing brush T is mounted on a pivot $T^1$ at the lower end of an arm $T^2$ which can be swung by a motor U from the position shown in Figure 11 to the position shown in Figure 12. For the purpose of severing the web from the expired reel a knife $V^1$ is mounted on a pivot V at the lower end of the arm $T^2$ and is controlled by a rod $V^2$ loaded by a spring $V^3$. When the backing brush T is in the inoperative position shown in Figure 11, that is to say lying clear of the translational movement of the supply roll D, a roller $T^3$ carried by the backing brush T engages a nose on the knife $V^1$, the arm $T^2$ then resting against a fixed stop $U^1$. During the acceleration of the replacement roll the movement of the spiders closes a contact which causes energisation of the motor U so that the arm $T^2$ is moved from the position shown in Figure 11 into the backing position shown in Figure 12. This movement of the arm $T^2$ and the consequent swinging movement of the rod $V^2$ causes the spring $V^3$ to be tensioned against a fixed abutment $V^4$ the parts being now in the position shown in Figure 12. The backing brush D now backs the running web W in a definite position as determined by the stop $U^2$ at which point the motor U breaks its own circuit. As the replacement roll D makes contact with the running web W at the position backed by the brush T, the brush is moved towards the arm $T^2$ against the action of a spring $T^4$ thus moving the roller $T^3$ off the nose of the knife $V^1$. The spring $V^3$ now turns the knife $V^1$ in the clockwise direction about the pivot V so as to sever the web connected to the expired roll E. The operation of the knife V¹ closes a pair of contacts (not shown) which reestablish the circuit of the motor U for reverse operation so that the arm T² is restored to the position shown in Figure 11 as limited by the stop U¹, the motor U then again breaking its own circuit.

It will be understood that the constructions described above are given by way of example only and that details may be modified without departing from the invention. For example, the reel stand or frame may be modified to suit requirements as by using a three-reel frame instead of a two-reel frame as described. Again, instead of the reel frame or stand being driven by mechanical means from the press or by a motor supplied with power from a press-driven generator, the reel stand or frame may be driven by a motor supplied with power from electric mains, this motor being regulated in conjunction with the drive of the press. For example, the speed of the motor may be automatically adjusted either so as to have a predetermined relationship to that of the press or by differential control of pilot generators driven by the web and the replacement roll periphery respectively so as to give a predetermined relationship between the peripheral speed of the replacement roll and that of the web. When the method of frame drive for the pasting operation does not include an electric motor, or where the motor used is unsuitable, a separate "rotation" motor is provided for rotation of the frame in either direction for loading the frame, supplied from a separate source of power.

The backing device may be operated independently of the reel stand movement, either manually or by means of a separate motor, so that initiation of the operation of the backing device in each case depends upon the operator. For example, the backing brush arms may normally be held in the inoperative position by means of a loading spring or springs. When making a paste the brush arms are moved manually until the brushes reach the predetermined backing position as determined by a positive stop which may be fixed or may be adjustable in accordance with the diameter of the replacement roll, in which position the brush arms are held until the paste has been made. The operator then operates the knife for severing the expiring web. When the expiring web has been thus severed the operator releases the brush arms which then move the backing brushes clear of the path of movement of the replacement roll under the action of the loading spring or springs. Instead of being controlled by a solenoid, the knife may be operated manually by moving a handle on the backing brush arms, thus causing the knife to be moved forward against the action of a spring into the path of the expiring web, the handle being released after the web has been severed so that the blade is again withdrawn. The forward movement of the backing brushes into the predetermined position may, however, tension a spring which is attached to the knife and which will be released by means of a manually operated latch at the appropriate moment after the paste has been made.

What I claim as my invention and desire to secure by Letters Patent is:

1. In web-feeding and joining mechanism for printing presses and the like, in combination, means whereby the running web is supplied from a supply roll to the press, a roll support rotatable about a main axis, a carrier for a replacement roll of web to a part of the periphery of which adhesive is applied, the carrier being rotatable about a subsidiary axis on the roll support, driving mechanism which turns the roll support about the main axis thereby causing uninterrupted translational movement of the replacement roll towards the running web until after the periphery of the replacement roll has been brought into contact with the running web, intermediate mechanism whereby the rotation of the roll support about the main axis causes rotation of the roll carrier about the subsidiary axis, and a device which backs the running web at a definite predetermined position in the path of the translational movement of the replacement roll, the position of the backing device and the rotational movement imparted to the replacement roll about the subsidiary axis, from an initial angular position thereof, during the said translational movement, being determined in accordance with the diameter of the replacement roll so that a part of the periphery of the replacement roll in advance of the adhesive thereon comes into contact with the running web before the adhesive itself comes into contact with the running web.

2. In web-feeding and joining mechanism for printing presses and the like, in combination, means whereby the running web is supplied from a supply roll to the press, a roll support rotatable about a main axis, a carrier for a replacement roll of web to a part of the periphery of which adhesive is applied, the carrier being rotatable about a subsidiary axis on the roll support, driving mechanism which turns the roll support about the main axis thereby causing uninterrupted translational movement of the replacement roll towards the running web until after the periphery of the replacement roll has been brought into contact with the running web, intermediate mechanism whereby the rotation of the roll support about the main axis causes rotation of the roll carrier about the subsidiary axis, a releasable coupling through which the drive is transmitted to the intermediate mechanism, a device controlling the said coupling, mechanism controlling the said device and operated by the rotational movement of the roll carrier about the main axis, a device which backs the running web at a definite predetermined position in the path of the uninterrupted translational movement of the replacement roll, and means whereby the timing of the operation of the said device controlling the coupling can be adjusted in accordance with the diameter of the replacement roll thus determining the rotational movement imparted to the replacement roll about the subsidiary axis, from an initial angular position thereof, during the translational movement of the roll about the main axis so that a part of the periphery of the replacement roll in advance of the adhesive thereon comes into contact with the running web before the adhesive itself comes into contact with the running web, the position of the backing device remaining the same whatever the diameter of the replacement roll.

3. In web-feeding and joining mechanism for printing presses and the like, in combination, means whereby the running web is supplied from a supply roll to the press, a roll support rotatable about a main axis, a carrier for a replacement roll of web to a part of the periphery of which adhesive is applied, the carrier being rotatable about a subsidiary axis on the roll support, driving mechanism which turns the roll support about the main axis thereby causing uninterrupted translational movement of the replacement roll towards the running web until after the periphery of the replacement roll has been brought into contact with the running web, intermediate mechanism whereby the rotation of the roll support about the main axis causes rotation of the roll carrier about the subsidiary axis, a releasable coupling through which the drive is transmitted to the intermediate mechanism, a device controlling the said coupling, mechanism controlling the said device and operated by, and in fixed timed relationship with, the rotational movement of the roll carrier about the main axis so that the rotational movement imparted to the replacement roll about the subsidiary axis from an initial angular position thereof during the translational movement of the roll remains the same whatever the diameter of the replacement roll, a device which backs the running web at a definite predetermined position in the path of the uninterrupted translational movement of the replacement roll, and means for adjusting the predetermined position of the backing device in accordance with the diameter of the replacement roll, so that a part of the periphery of the replacement roll in advance of the adhesive thereon comes into contact with the running web before the adhesive itself comes into contact with the running web.

4. In web-feeding and joining mechanism for printing presses and the like, in combination, a roll support rotatable about a main axis, a carrier for a supply roll rotatable about a subsidiary axis on the roll support, means whereby the running web is supplied to the press from the supply roll, a carrier for a replacement roll rotatable about a second subsidiary axis on the roll support, mechanism for driving the roll support about the main axis, thereby causing uninterrupted translational movement of the replacement roll until after it has made contact with the running web, intermediate mechanism through which the carrier for the replacement roll is driven about its own axis by the rotation of the roll support about the main axis, the rotational movement of the replacement roll about its own axis being thus in direct relationship to the said translational movement, a device which backs the running web in a definite predetermined position in the path of the translational movement of the replacement roll, and means for determining at will, and in accordance with the diameter of the replacement roll, the relationship between the said predetermined position and the rotational movement imparted to the replacement roll during the translational movement thereof from an initial angular position of the roll support, so that a predetermined part of the periphery of the replacement roll, as determined by the said relationship, first contacts with the running web.

5. In web-feeding and joining mechanism for printing presses and the like, in combination, means whereby the running web is supplied from a supply roll to the press, a replacement roll support rotatable about a main axis, a replacement roll carrier rotatable about a subsidiary axis on the said support, driving mechanism which turns the support about the main axis, thereby causing uninterrupted translational movement of the replacement roll until after it has made contact with the running web, and rotates the said carrier and replacement roll about the subsidiary axis so that the rotational movement of the replacement roll about the subsidiary axis bears a direct relationship to the said translational movement, a device which backs the running web in a definite predetermined position in the path of the said translational movement of the replacement roll, and means whereby the said predetermined backing position is adjustable at will in accordance with the diameter of the replacement roll, so that the position of the backing device adjusted in accordance with the roll diameter, in conjunction with the constant degree of rotational movement imparted to the roll about the subsidiary axis during the rotational movement of the roll support about the main axis ensures that a predetermined part of the replacement roll periphery first contacts with the running web.

6. In web-feeding and joining mechanism for printing presses and the like, in combination, a roll support rotatable about a main axis, a carrier for a supply roll rotatable about a subsidiary axis on the roll support, means whereby the running web is supplied to the press from the supply roll, a carrier for a replacement roll rotatable about a second subsidiary axis on the roll support, mechanism for turning the roll support about the main axis, thereby causing uninterrupted translational movement of the replacement roll until after it has contacted with the running web, intermediate mechanism through which the replacement roll is rotated about its own axis by the rotation of the roll support about the main axis, the rotational movement of the replacement roll about its own axis being thus in direct relationship to the said translational movement, a device which backs the running web in a definite predetermined position in the path of uninterrupted translational movement of the replacement roll, and means whereby the said predetermined position is adjustable at will in accordance with the diameter of the replacement roll, so that the position of the backing device adjusted in accordance with the roll diameter, in conjunction with the constant degree of rotational movement imparted to the roll about the second subsidiary axis during the translational movement of the roll, ensures that a predetermined part of the replacement roll periphery first contacts with the running web, the peripheral speed of the replacement roll being equal to the linear speed of the running web.

7. In web-feeding and joining mechanism for printing presses and the like, in combination, means whereby the running web is supplied from a supply roll to the press, a roll support rotatable about a main axis, a replacement roll carrier rotatable about a subsidiary axis on the said support, said carrier engaging a replacement roll to whose periphery adhesive is applied at or adjacent to the end of the web, mechanism which turns the roll support about the main axis, thereby causing uninterrupted translational movement of the replacement roll until after it has contacted with the running web, and rotates the said carrier and replacement roll about the subsidiary axis so that the rotational movement of the replacement roll about the subsidiary axis bears a direct relationship to the said translational movement, a device which backs the running web in a definite predetermined position in the path of the translational movement of the replacement roll, the replacement roll contacting with the running web at the said position determined by the backing device when the peripheral speed of the replacement roll bears a predetermined relationship to the linear speed of the running web, and means for determining the position of the adhesive on the replacement roll at the commencement of the rotational movement thereof in accordance with the said translational and rotational movements thus ensuring that the running web always contacts with the periphery of the replacement roll at a part thereof in advance of the said adhesive.

8. In web-feeding and joining mechanism for printing presses and the like, in combination, means whereby the running web is supplied from a supply roll to the press, a roll support rotatable about a main axis, a replacement roll carrier rotatable about a subsidiary axis on the said support, said carrier engaging a replacement roll to whose periphery adhesive is applied at or adjacent to the end of the web, mechanism which turns the roll support about the main axis, thereby causing uninterrupted translational movement of the replacement roll until after it has made contact with the running web, and rotates the said carrier and replacement roll about the subsidiary axis so that the rotational movement of the replacement roll about the subsidiary axis bears a direct relationship to the said translational movement whilst the degree of rotational movement imparted to the replacement roll during the translational movement thereof remains constant, a device which backs the running web in a definite predetermined position in the path of the uninterrupted translational movement of the replacement roll, means whereby the said predetermined position is adjustable at will in accordance with the diameter of the replacement roll, and means for maintaining constant the initial position of the peripheral portion of the replacement roll bearing the adhesive at the commencement of the rotational movement of the replacement roll, the position of the backing device adjusted in accordance with the roll diameter, in conjunction with the constant degree of rotational movement imparted to the replacement roll from the said initial position during the translational movement, ensuring that a part of the periphery of the replacement roll in advance of the adhesive contacts with the running web, before the adhesive contacts therewith, when the peripheral speed of the replacement roll bears a predetermined relationship to the linear speed of the running web.

9. In web-feeding and joining mechanism for printing presses and the like, in combination, means whereby the running web is supplied from a supply roll to the press, a roll support rotatable about a main axis, a replacement roll carrier rotatable about a subsidiary axis on the said support, mechanism which turns the roll support about the main axis, thereby causing uninterrupted translational movement of the replacement roll until after it has contacted with the running web, and rotates the said carrier and replacement roll about the subsidiary axis so that the rotational movement of the replacement roll about the subsidiary axis bears a direct relationship to the said translational movement, means for determining at will the timing of the commencement of the rotational movement of the roll during the translational movement of the roll in accordance with the diameter of the replacement roll, and a device which backs the running web in a definite predetermined position in the path of the uninterrupted translational movement of the replacement roll, the degree of rotational movement imparted to the replacement roll adjusted in accordance with the roll diameter, in conjunction with the constant position of the backing device, ensuring that a predetermined part of the periphery of the roll will first contact with the running web, the peripheral speed of the replacement roll bearing a predetermined relationship to the linear speed of the running web when contact takes place.

10. In web-feeding and joining mechanism for printing presses and the like, in combination, a roll support rotatable about a main axis, a carrier for a replacement roll rotatable about a subsidiary axis on the roll support, means whereby the running web is supplied to the press from a supply roll, mechanism for turning the roll support about the main axis, a toothed gear through which the drive is transmitted to the said carrier, a fixed toothed member engaging said gear so that rotation of the roll support about the main axis causes uninterrupted translational movement of the replacement roll until after it has contacted with the running web and the replacement roll is rotated about its own axis due to translational movement of the carrier relatively to the fixed toothed member, the rotational movement of the replacement roll about its own axis being thus in direct relationship to the said translational movement, and a device which backs the running web in a definite predetermined position in the path of the translational movement of the replacement roll, the periphery of the replacement roll contacting with the running web at the said definite position determined by the backing device when the peripheral speed of the replacement roll bears a predetermined relationship to the linear speed of the running web.

11. In web-feeding and joining mechanism for printing presses and the like in combination, a supporting base, a roll support rotatable about a main axis on said base, a carried for a supply roll rotatable about a subsidiary axis on the roll support, means whereby the running web is supplied to the press from the supply roll, a carrier for a replacement roll to which adhesive is supplied at or near the end of the web, said carrier and replacement roll being rotatable about a second subsidiary axis on the roll support, mechanism for driving the roll support about the main axis, thereby causing translational movement of the replacement roll towards the running web, intermediate mechanism through which the carrier for the replacement roll is driven about its own axis by the rotation of the roll support about the main axis, the rotational movement of the replacement roll about its own axis being thus in direct relationship to the said translational movement, releasable clutch couplings between the intermediate mechanism and the carriers respectively, a clutch control device mounted in fixed relationship with respect to said base, a device for adjusting the clutch control device in accordance with the diameter of the replacement roll, a device for adjusting the replacement roll about its own axis so as to position the part of the periphery of said roll bearing the adhesive, at the commencement of rotational movement of the replacement roll, in accordance with the diameter of the replacement roll, a device which backs the running web in a definite predetermined position in the path of the translational movement of the replacement roll, the clutch control device releasing the clutch associated with the replacement roll after a predetermined translational movement of the replacement roll towards the running web so that the degree of rotational movement imparted to the replacement roll and adjusted in accordance with the diameter thereof, in conjunction with the constant position of the backing device, ensure that a part of the periphery in advance of the adhesive will contact with the running web before the adhesive contacts therewith, the peripheral speed of the replacement roll bearing a predetermined relationship to the linear speed of the running web.

12. In web-feeding and joining mechanism for printing presses and the like, in combination, means whereby the running web is supplied from a supply roll to the press, a roll support rotatable about a main axis, a replacement roll carrier rotatable about a subsidiary axis on the roll support, mechanism which turns the support about the main axis, thereby causing uninterrupted translational movement of the replacement roll until after it has contacted with the running web, and rotates the said carrier and replacement roll about the subsidiary axis so that the rotational movement of the replacement roll about the subsidiary axis bears a direct relationship to the said translational movement, a device for backing the running web, a stop which limits movement of the backing device towards the running web, and mechanism through which the backing device is operated up to the stop by rotation of the roll support about the main axis, the backing device thus backing the running web in a definite predetermined position in the path of the translational movement of the replacement roll, the backing device acting as an abutment for pressing the running web against the replacement roll at the said predetermined position, the peripheral speed of the replacement roll then bearing a predetermined relationship to the linear speed of the running web.

13. In web-feeding and joining mechanism for printing presses and the like, in combination, a roll support rotatable about a main axis, a carrier for a supply roll rotatable about a subsidiary axis on the roll support, means whereby the running web is supplied to the press from the supply roll, a carrier for a replacement roll rotatable about a second subsidiary axis on the roll support, mechanism for turning the roll support about the main axis, thereby causing uninterrupted translational movement of the replacement roll until after it has contacted with the running web, intermediate mechanism through which the replacement roll is rotated about its own axis by the translational movement thereof about the main axis so that the rotational movement of the replacement roll about its own axis bears a direct relationship to the said translational movement, the timing of the commencement of the rotational movement of the replacement roll during the translational movement thereof remaining constant, a device for backing the running web, a stop which limits movement of the backing device towards the running web, mechanism through which the backing device is operated up to the stop by rotation of the roll support about the main axis, the backing device thus backing the running web in a definite predetermined position in the path of uninterrupted translational movement of the replacement roll, and means for adjusting the said stop in accordance with the diameter of the replacement roll, the position of the backing device as thus determined, in conjunction with the constant degree of rotational movement imparted to the replacement roll, ensuring that a predetermined part of the replacement roll first contacts with the running web, the peripheral speed of the replacement roll bearing a predetermined relationship to the linear speed of the running web.

14. In web-feeding and joining mechanism for printing presses and the like, in combination, a supporting base, a roll support rotatable about a main axis on the said base, a driving chuck on the roll support for engaging a supply roll of web, a driving chuck on the roll support for engaging a replacement roll of web to which adhesive has been applied at the end portion of the web, means whereby the running web is supplied to the press from the supply roll, releasable clutch couplings associated with the two driving chucks respectively, driving mechanism which turns the roll support about the main axis in accordance with the speed of the press, intermediate mechanism through which rotation of the roll support about the main axis transmits rotary movement to the driving chuck of the replacement roll through the associated clutch, rotation of the roll support thus causing translational movement of the replacement roll towards the running web and also rotational movement of the replacement roll about its own axis, a device for determining, in accordance with the diameter of the replacement roll, the timing of the commencement of rotation thereof about its own axis relatively to the angular position of the roll support about the main axis, a clutch control cam normally in fixed relationship with respect to the base, means for adjusting the said cam about the main axis in accordance with the diameter of the replacement roll, the said cam disengaging the clutch of the replacement roll after a predetermined rotational movement of the roll about its own axis, a device for initially positioning the part of the replacement roll bearing the adhesive in accordance with the said timing of the commencement of rotation of the replacement roll about its own axis, a device which backs the running web in a definite predetermined position in the path of the translational movement of the replacement roll, and mechanism by which the backing device is driven from the roll support, the degree of rotational movement imparted to the replacement roll and determined in accordance with the diameter of the roll, in conjunction with the constant position of the backing device, ensuring that the replacement roll first contacts with the running web at a part of the periphery of the replacement roll in advance of the adhesive thereon, the peripheral speed of the roll being equal to the speed of the running web.

15. In web-feeding and joining mechanism for printing presses and the like, in combination, a supporting base, a roll support rotatable about a main axis on the said base, a driving chuck on the roll support for engaging a supply roll of web, a driving chuck on the roll support for engaging a replacement roll of web to which adhesive has been applied at the end portion of the web, means whereby the running web is supplied to the press from the supply roll, releasable clutch couplings associated with the two driving chucks respectively, driving mechanism which turns the roll support about the main axis in accordance with the speed of the press, intermediate mechanism through which rotation of the roll support about the main axis imparts rotary movement to the driving chuck of the replacement roll about its own axis through the associated clutch, rotation of the roll support thus causing translational movement of the replacement roll towards the running web and also rotational movement of the replacement roll about its own axis, a device for maintaining constant the timing of the commencement of rotation of the replacement roll about its own axis relatively to the angular position of the roll support about the main axis, a device for maintaining constant the position of the part of the replacement roll bearing the adhesive at the commencement of the said rotation of the replacement roll, a clutch control member mounted in fixed positional relationship with respect to the said base, the clutch control member thus always disengaging the clutch of the replacement roll after the same rotational movement of the replacement roll about its own axis has taken place, a device which backs the running web in a definite predetermined position in the path of the translational movement of the replacement roll, mechanism whereby the backing device is driven in timed relation with the roll support, and a device by which the said mechanism can be adjusted at will for setting the said predetermined backing position in accordance with the diameter of the replacement roll, the constant degree of rotational movement imparted to the replacement roll, in conjunction with the position of the backing device adjusted in accordance with the diameter of the replacement roll, ensuring that the replacement roll first contacts with the running web at a part of the periphery of the replacement roll in advance of the adhesive thereof, the peripheral speed of the replacement roll being equal to the liner speed of the running web.

16. In web-feeding and joining mechanism for printing presses and the like, in combination, means whereby the running web is supplied from a supply roll to the press, a roll support rotatable about a main axis, a replacement roll carrier rotatable about a subsidiary axis on the roll support, mechanism which turns the support about the main axis thereby causing translational movement of the replacement roll towards the running web, mechanism which rotates the said carrier and replacement roll about the subsidiary axis, a device which backs the running web in a definite predetermined position in the path of translational movement of the replacement roll, and mechanism, operated by the rotational movement of the support about the main axis, which operates the backing device in timed relation with the translational movement of the replacement roll.

ALEXANDER THORNTON ROBERTSON.